US008667059B2

(12) United States Patent
Singh et al.

(10) Patent No.: US 8,667,059 B2
(45) Date of Patent: Mar. 4, 2014

(54) SYSTEM AND METHOD FOR PROVIDING AGENT MANAGED SUPPORT VIA INSTANT MESSAGING

(75) Inventors: Amit Singh, Irving, TX (US); Fariborz Ebrahimi, Arlington, VA (US); Dinyar Kavouspour, Plano, TX (US); Bipin Sakamuri, Irving, TX (US); Amar Nageswaram, Irving, TX (US); Nikhil Goel, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1143 days.

(21) Appl. No.: 11/771,184

(22) Filed: Jun. 29, 2007

(65) Prior Publication Data

US 2009/0006550 A1   Jan. 1, 2009

(51) Int. Cl.
G06F 15/16   (2006.01)

(52) U.S. Cl.
USPC ............ 709/204; 709/203; 709/206; 709/217

(58) Field of Classification Search
USPC .................... 709/204–207, 227–229
See application file for complete search history.

(56) References Cited

U.S. PATENT DOCUMENTS

| 6,606,644 | B1* | 8/2003 | Ford et al. ..................... 709/204 |
| 8,046,259 | B1* | 10/2011 | Siegel et al. ............... 705/14.73 |
| 2002/0073210 | A1* | 6/2002 | Low et al. ..................... 709/228 |
| 2005/0132298 | A1* | 6/2005 | Lueckhoff et al. ............ 715/758 |
| 2005/0193055 | A1* | 9/2005 | Angel et al. ................ 709/202 |
| 2008/0005240 | A1* | 1/2008 | Knighton et al. ............. 709/204 |

* cited by examiner

*Primary Examiner* — David X Yi

(57) ABSTRACT

An approach is disclosed for providing a managed chat session. An agent establishes a chat session with a user for customer support. Information from the user is received via the chat session, wherein the information is used to determine customized content to be presented to the user over the chat session for duration of the chat session.

14 Claims, 5 Drawing Sheets

US 8,667,059 B2

SYSTEM AND METHOD FOR PROVIDING AGENT MANAGED SUPPORT VIA INSTANT MESSAGING

BACKGROUND INFORMATION

Providing high quality service to customers has become a primary consideration by organizations and companies, such as those in the telecommunications, manufacturing, finance, as well as other service oriented businesses that are seeking to gain a competitive edge in their respective markets. To this end, companies in these sectors spend significant amounts of money to provide a high level of customer service. For example, enormous investments have been made to establish call centers for handling customer inquiries. Traditionally, companies have relied on telephony services to address the customers' needs, e.g., provisioning toll-free customer service telephone numbers for call centers, so that customers can reach their service representatives with incurring cost. However, it is recognized that the convergence of traditional telephony communications and data communications has enable other cost-effective means for reaching out to customers. For example, with the increasing popularity of chat (i.e., instant messaging (IM)) applications, organizations have started to consider chat-based customer service. However, even though the messaging may be "instant," the processing time for a service representative to address the customer's problem or inquiry remains somewhat unchanged from that traditional telephony call center model. Consequently, customer satisfaction may be negatively impacted if this processing period is significant. Furthermore, with traditional chat-based systems, the customer service representative has very little control over the user experience of the customer.

Based on the foregoing, there is a clear need for an efficient approach to provide support services over a chat-based system, while enhancing user experience.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF PREFERRED EMBODIMENTS

An apparatus, method, and software for providing a managed chat session are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to chat or instant messaging applications, it is contemplated that these embodiments have applicability to other equivalent applications.

Figure 1:
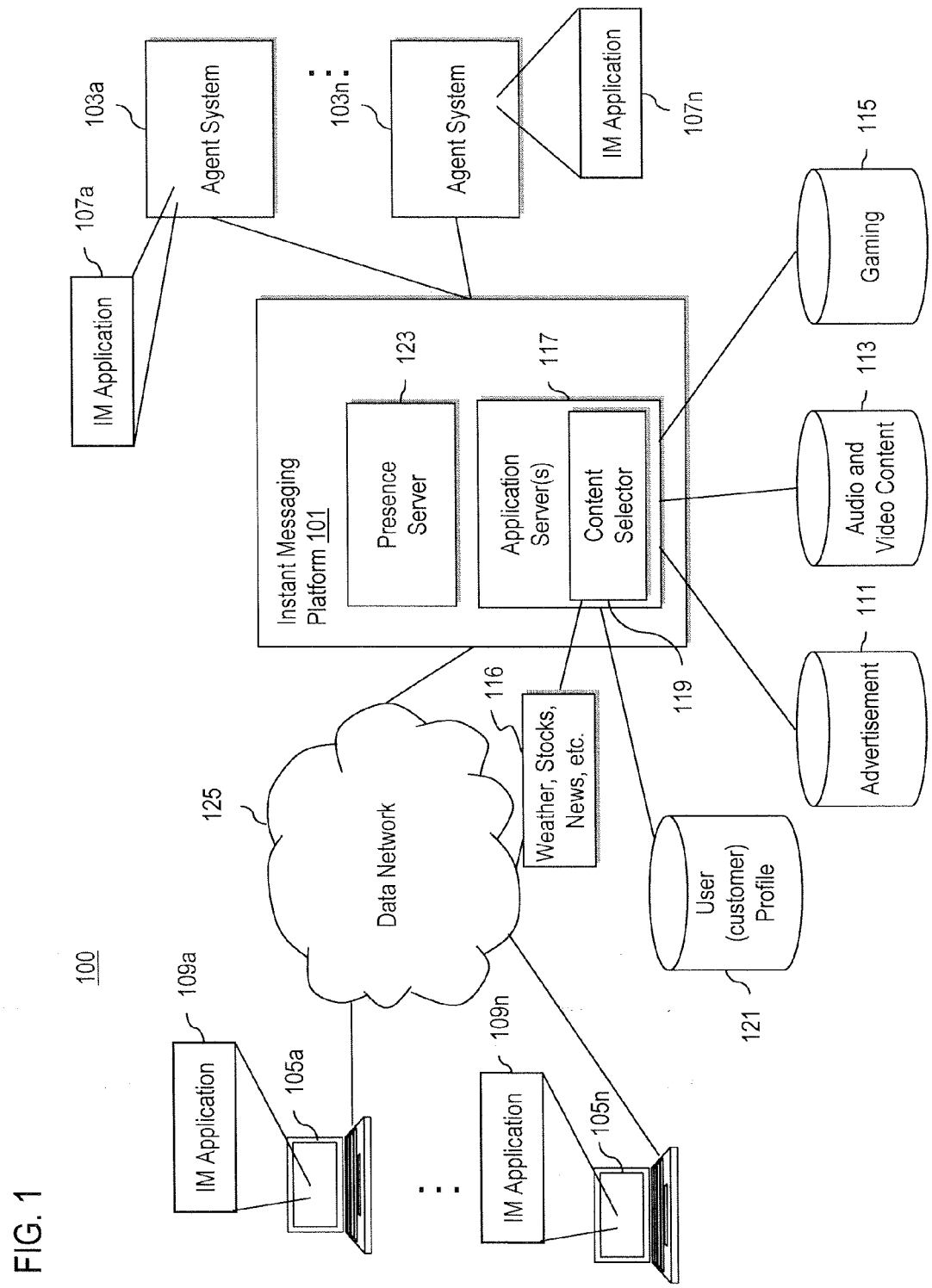
FIG. 1 is a diagram of a communication system capable of providing a managed instant messaging (or chat) session, according to various exemplary embodiments.

FIG. 1 is a diagram of a communication system capable of providing a managed instant messaging (or chat) session, according to various exemplary embodiments. A communication system 100 includes an instant messaging (IM) (or instant communication) platform 101 that facilitates establishment of instant messaging, or chat, sessions among users and agents for a managed chat service. The IM platform 101 enables an agent to form a list of users that they are serving, and process messages, such as text messages, between endpoints. In an exemplary embodiment, the agents possess the capability to control and manage the chat interface experienced by the users.

For the purposes of illustration, the system 100 is described with respect to deployment within a service provider or organization that employs one or more agents utilizing agent systems 103a-103n to assist users (e.g., customers) via computing devices 105a-105n with services and products offered by the service provider. The computing devices 105a-105n can include desktop personal computers, workstations, web appliances, personal digital assistants (PDAs), palm computers, etc. The agent is, for instance, a customer service representative who can provide such services as provisioning, trouble-ticket handling, technical support, accounting, etc., to one or more users. As shown, each of the agent systems 103a-103n, according to one embodiment, executes instant messaging (IM) applications (or clients) 107a-107, respectively. Likewise, the computing devices 105a-105n are loaded with IM applications 109a-109n to communicate with the agent systems 103a-103n.

Chat-based customer support is appealing to both customers and businesses alike, as providing chat-based services is less costly compared to telephone based customer service, and customers may find that this alternative form of communication to be more effective—i.e., can access a customer service representative more quickly than the case with telephone based support. On average, customers typically spend about 10 minutes on chat with a representative; however, not all this time is spent in continuous interaction with a representative. There may be intermittent periods of time in which the representative needs to spend time on tasks and activities addressing the customer's inquiry (or simply time associated with typing). Consequently, the customer spends is relatively idle on the computer.

The system 100, according to certain embodiments, utilizes these idle periods to deliver targeted content, such as advertisements to the user. Advertising carried out over data networks, also referred to as "Online Advertising" has become an extremely popular form of advertising as it creates innovative, comparatively low cost and highly targeted opportunities for online advertisers and marketers. Online advertising in its current form is being mostly carried out through search engine advertising, advertising networks and opt-in e-mail advertising. Even though these methods can be viewed as an improvement over traditional marketing approaches that are implemented through popular media such as television, magazines and direct mailing, most of the online advertising approaches still depends on the browsing and search behavior of the customer. For example, companies (such as those in the marketing sector) traditionally keep track of which websites a customer is regularly visiting and prepare advertisements based on traffic patterns, past purchases, etc. This form of advertising, however, is not efficient as it is difficult to judge whether the customer is just generally browsing a particular website or is genuinely searching for a specific piece of information, service or product.

The idle periods of time during a chat session present an opportunity to relay relevant advertisements to the customer, as the customer may have the propensity to read these advertisements instead of waiting idly for the service representative to obtain information or perform tasks. The customer service representative, for example, may quickly look up information regarding the customer and generate advertisements based on various aspects such as the customer's background, the services he/she is using, etc. As an alternative, the advertisement may be generated automatically based on the customer's profile. This form of highly targeted online advertising can yield high conversion rates of online ads shown versus products/services ordered in comparison to merely monitoring the customer's online traffic patterns. Additionally, this kind of advertising is relative inexpensive, as marketing is essentially piggybacked over a customer support infrastructure. Moreover, this approach can serve as a source of revenue for service providers, whereas in conventional approaches, customer support is strictly an operational cost.

Furthermore, it is recognized that during such idle periods, according to certain embodiment, the chat interface, in addition to advertisements, can be utilized to deliver content in general. Such content can involve advertisement information for enabling up-selling and cross-selling of products and services, as well as audio files, video clips and video games (or other media). Moreover, such content can be customized or personalized to the particular customer.

The IM platform 101, thus, interfaces with various databases that store the content that is to be provided as part of the customers' chat interface. In one embodiment, an advertisement database 111 is utilized to store information about the products and services of the service provider. In addition, the service provider can include advertisement information of third parties, thereby providing a source of revenue for the service provider. The database 111 can house information about promotions, bundled offers, etc. Additionally, the customer can be provided with free music, free movie clips, online games or other information such as weather reports, stock prices, news headlines, such that the user may play while engaged in the chat session with the service representative. As such, an audio and video database 113 that stores music files and video files is used. Further, a database 115 for the games and a repository (or interface) 116 for accessing information, such as news content, (e.g., weather reports, stock prices, or news headlines) is provided.

The databases 111, 113, 115 and 116 are accessed by one or more application server(s) 117. The application server 117 includes a content selector 119 that selects the content from among the various databases 111, 113, 115 and 116 for presentation to the customer. The selection process, as more fully described in FIGS. 3A and 3B, may involve the use of artificial intelligence (AI) for tailoring (or personalizing) the content to the particular customer based on information supplied by the customer. Such information is stored in a customer profile database 121. By way of example, the customer profile database 121 can include data such as customer name, address, profile, location, interests, subscriptions, etc.

The IM platform 101 also includes a presence server 123 to determine which users and agents are online. Because of the immediate or instant nature of the communication, instant messaging service requires presence information or availability of the users. The computing devices 105a-105n send presence information (e.g., presence messages) over a data network 125 to the presence server 123 to indicate state of the devices 105a-105n. The data network 125 can include the global Internet. The agent systems 103a-103n also transmit presence information to indicate their availability to conduct chat sessions. This presence information is updated periodically. Additionally, presence server 123 can track the availability of the content, itself, for delivery to the customers; in this manner, the agent can select content that is available—this capability is useful when the particular content has a short life or is frequently changing, such as promotional information.

Thus, according to an exemplary embodiment, the idle period during the customer support chat session may be used to generate electronic forms of advertisement, based on information from the advertisement database 111. The content of the advertisement can be compiled based on the customer's questions and background (e.g., customer profile), and may be either generated through the customer service representative's input or using artificial intelligence. The content of the advertisements can be text or may also contain additional forms of information, such as video, audio or other multimedia types. Preparing targeted advertisements with highly relevant content increases a customer's propensity to click on (or otherwise select) such advertisements.

The operation of the communication system 100 for providing chat-based customer support is explained below.

Figure 2:
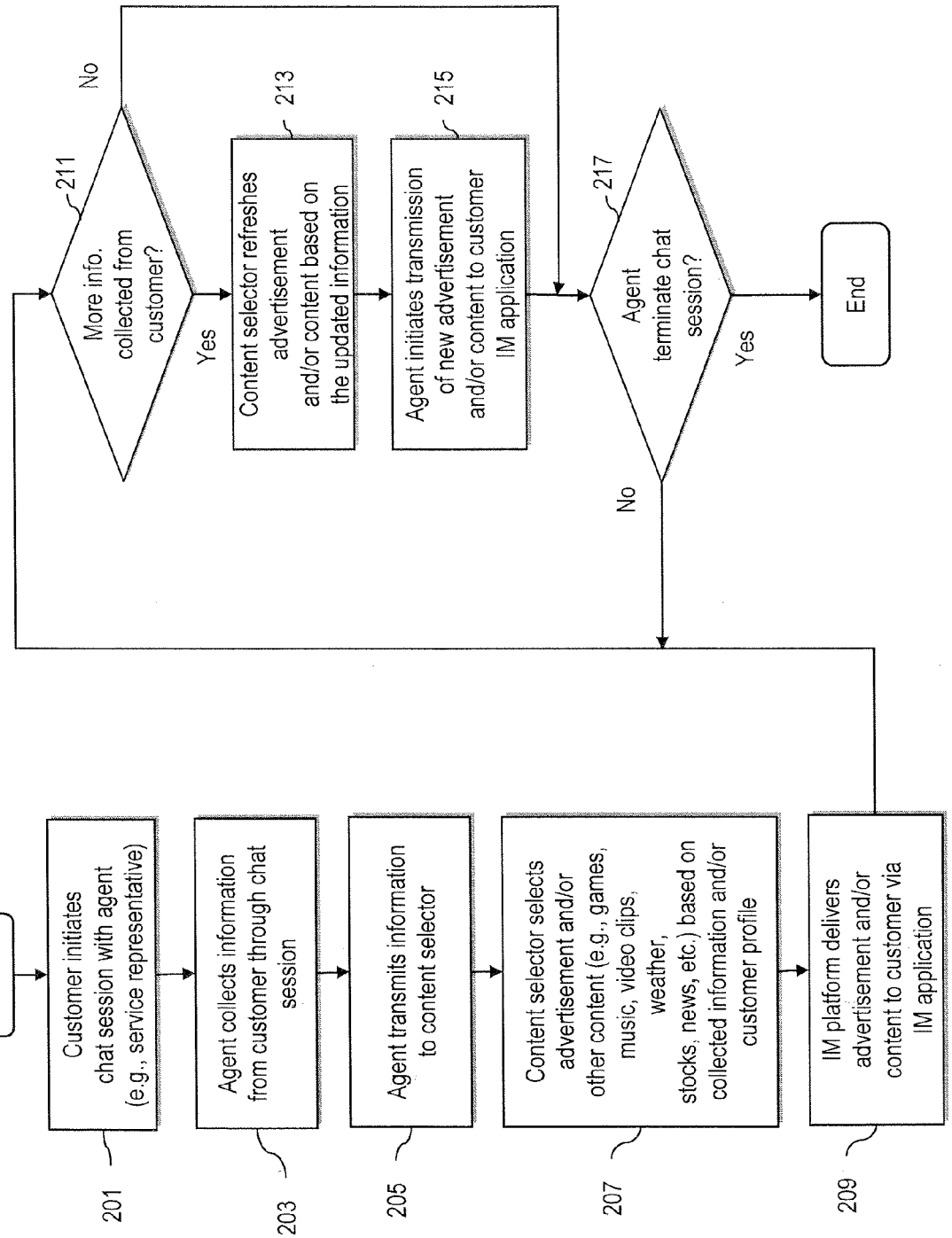
FIG. 2 is a flowchart of a process for providing a managed chat session, according to an exemplary embodiment.

FIG. 2 is a flowchart of a process for providing a managed chat session, according to an exemplary embodiment. For explanatory purposes, in this example, the term "customer" and "agent" refer to the corresponding devices or system that enables them to participate in a chat session. In step 201, the customer 105a initiates a support session with the agent 103a. The agent 103a poses various questions to the customer 105a as part of the support process in resolving the customer's inquiry or need. The responses from the customer 105a are then collected, as in step 203. The support representative 103a, in step 205, transmits the collected information to content selector 119, which can generate a customized advertisement or otherwise select content based on the customer's profile stored in the customer profile database 121 and/or the responses to the questions, per step 207. Alternatively, the advertisement may be generated automatically based on customer information stored in the database 121, which may entail use of artificial intelligence provided by the content selector 119. The advertisement may then by transmitted via the data network 125 to the customer 105a, in step 209. The customer 105a may select the advertisement (e.g., in form of a hyper link) or may alternatively not access the advertisement at all. As mentioned, the advertisement may contain text, audio, video or a combination of the various forms of multimedia. Other content can be displayed within or separately from the advertisement: music file, video file, online games, weather reports, stock prices, and/or news headlines.

In steps 211 and 213, if more information is collected from the customer support chat-session, the agent 103a can instruct the content selector to refresh the advertisement and/or content based on this additional information. Such content is then supplied, as in step 215, to the customer 103a during the chat session with the agent 103a.

At this point, if the support session is completed, the chat session may be terminated by either the customer or the service representative (step 217). If the support session is not completed, then the service representative may continue to provide support, and steps 211-215 are repeated. In one embodiment, the profile of the customer 105a is updated in the profile database 121, upon termination of the chat session.

Figure 3B:
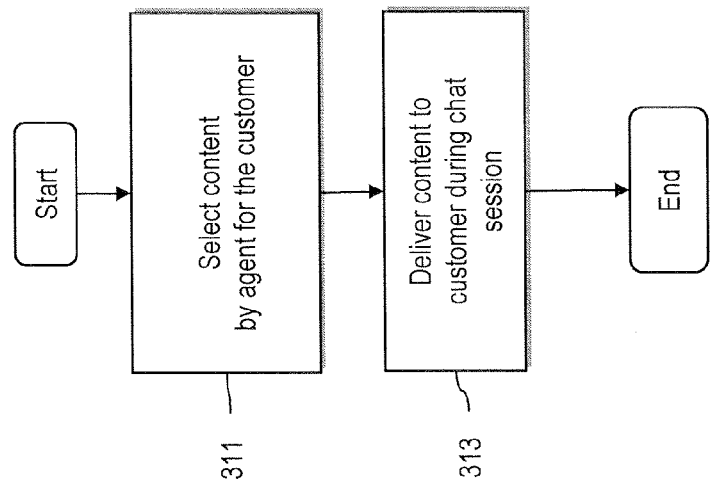
FIGS. 3A and 3B are flowcharts of processes for customizing advertisement and/or content for presentation during a chat session between an agent and a customer, according to an exemplary embodiment.
Figure 3A:
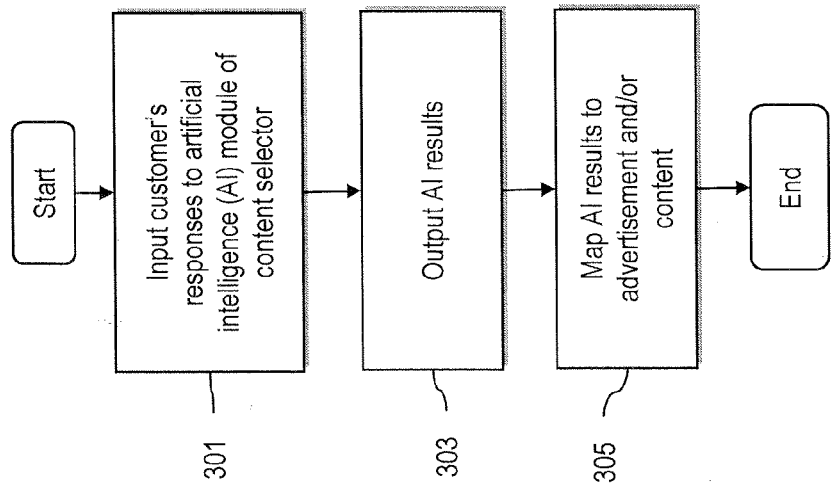

FIGS. 3A and 3B are flowcharts of processes for customizing advertisement and/or content for presentation during a chat session between an agent and a customer, according to an exemplary embodiment. Continuing with the example of FIG. 2, the content selection process is now explained. According to one embodiment (shown in FIG. 3A), the responses from the customer 105a are provided to the content selector 119, which can utilize an artificial intelligence algorithm (e.g., neural network, fuzzy system, expert system, etc.) to personalize the content, per steps 301 and 303. The AI algorithm generates a score that is mapped to the advertisement and/or content (step 305).

Alternatively, as in FIG. 3B, the agent 103a can select the content for the customer 105a based on the agent's knowledge of the customer through the chat session as well as the customer profile (step 311). The specified content can be readily delivered to the customer 105a during the chat session, per step 313.

Figure 4:
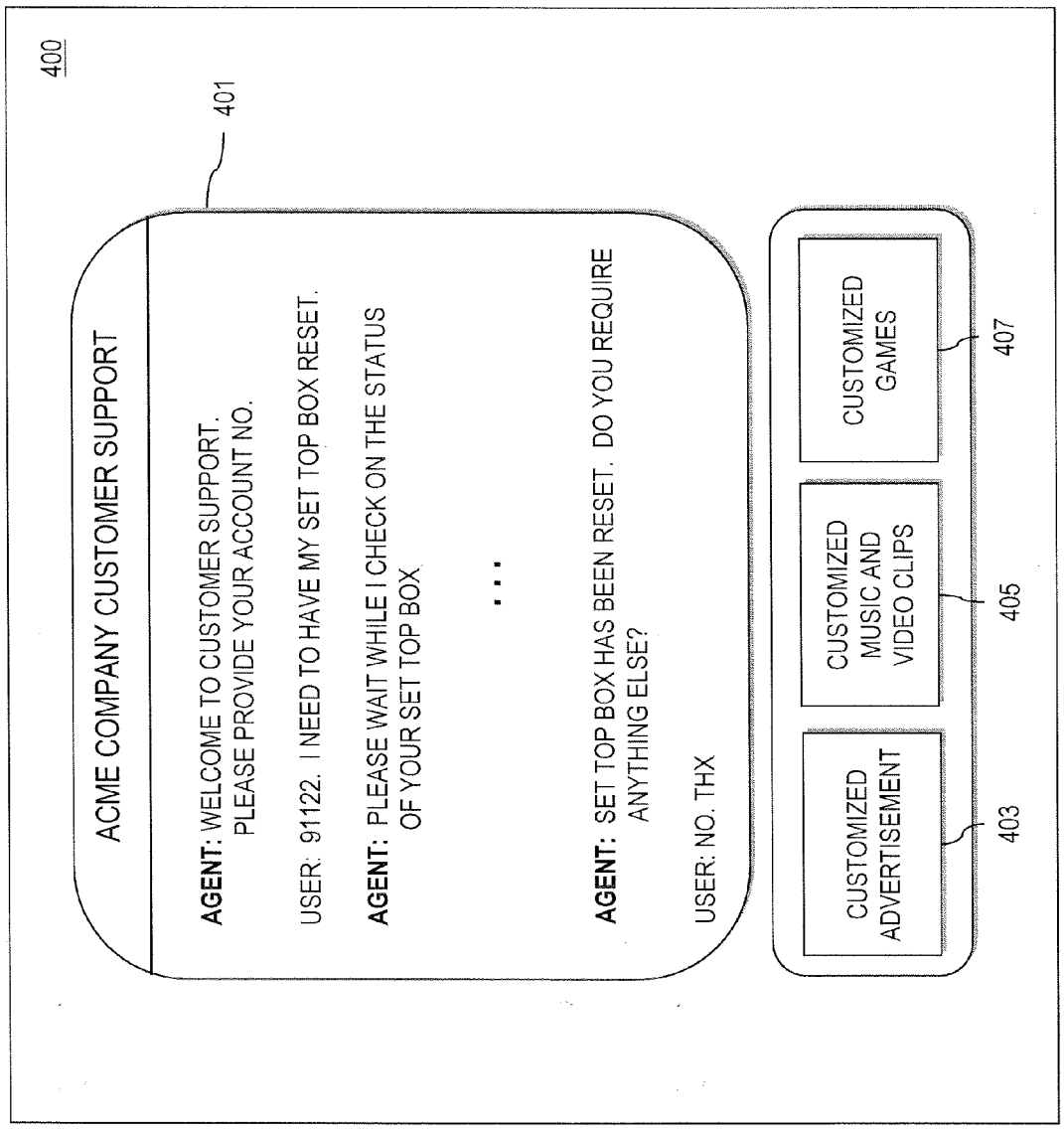
FIG. 4 is a diagram of a graphical user interface (GUI) providing a managed chat interface, according to an exemplary embodiment.

FIG. 4 is a diagram of a graphical user interface (GUI) providing a managed chat interface, according to an exemplary embodiment. In this example, an exemplary GUI 400 is provided by the IM application 109a for the customer 105a. It is assumed that the IM application 109a has established a chat session between the customer 105a and the agent 103a. Hence, a text box 401 contains a text dialogue between the agent 103a and the customer 105a. For instance, the customer 105a, who is a subscriber to a television service, has a concern about a malfunctioning set top box. The agent 103a initiates the chat session with an introductory phrase: "Welcome to customer support. Please provide your account number." In response, the customer 105a supplies an account number, and at this time, states the reason for the service "call." Alternatively, any identifier can be use to uniquely identify the user. Under this scenario, the customer 105a is somewhat knowledgeable about the technical malfunction, and requests that the set top box be reset. Thereafter, the agent 103a can retrieve the profile of the customer 105a and perform the necessary activities for servicing the set top box. The agent 103a can alert the customer 105a that there will be a wait period, by stating "Please wait while I check on the status of your set top box." During this idle period, the agent can select content to be presented to the customer 105a; this selection can alternatively be performed by the content selector 119.

For example, the agent 103a selects a personalized advertisement, which is displayed in form of a banner 405. Additionally, the agent 103a is aware of the customer's preferences (e.g., hobbies include sailing and tennis) because of the retrieve customer profile. Using a content selection process (as described above in FIGS. 3A and 3B), in addition to the personalized advertisement 405, which may involve third party products or services relating to sailing and tennis, other content is provided. Personalized music and video clips, as represented in selectable area 407, can represent the latest available music and movie trailers. Further, personalized games can be provided by selection of the area 409. For instance, the gaming area 409 can display a demo version of the latest tennis video game.

Hence, the described chat-based customer service capability provides businesses or organizations with an efficient way to cater to their customers' needs. Specifically, the above arrangement, according to certain embodiments, can significantly reduce the cost of providing customer support, while enhancing the customer can experience higher levels of customer satisfaction in that the customer is provided with targeted advertisement that may be of interest. Also, the customer can be supplied with other content to entertain or amuse the customer.

The above described processes relating to managing, by an agent, a chat interface for customer support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
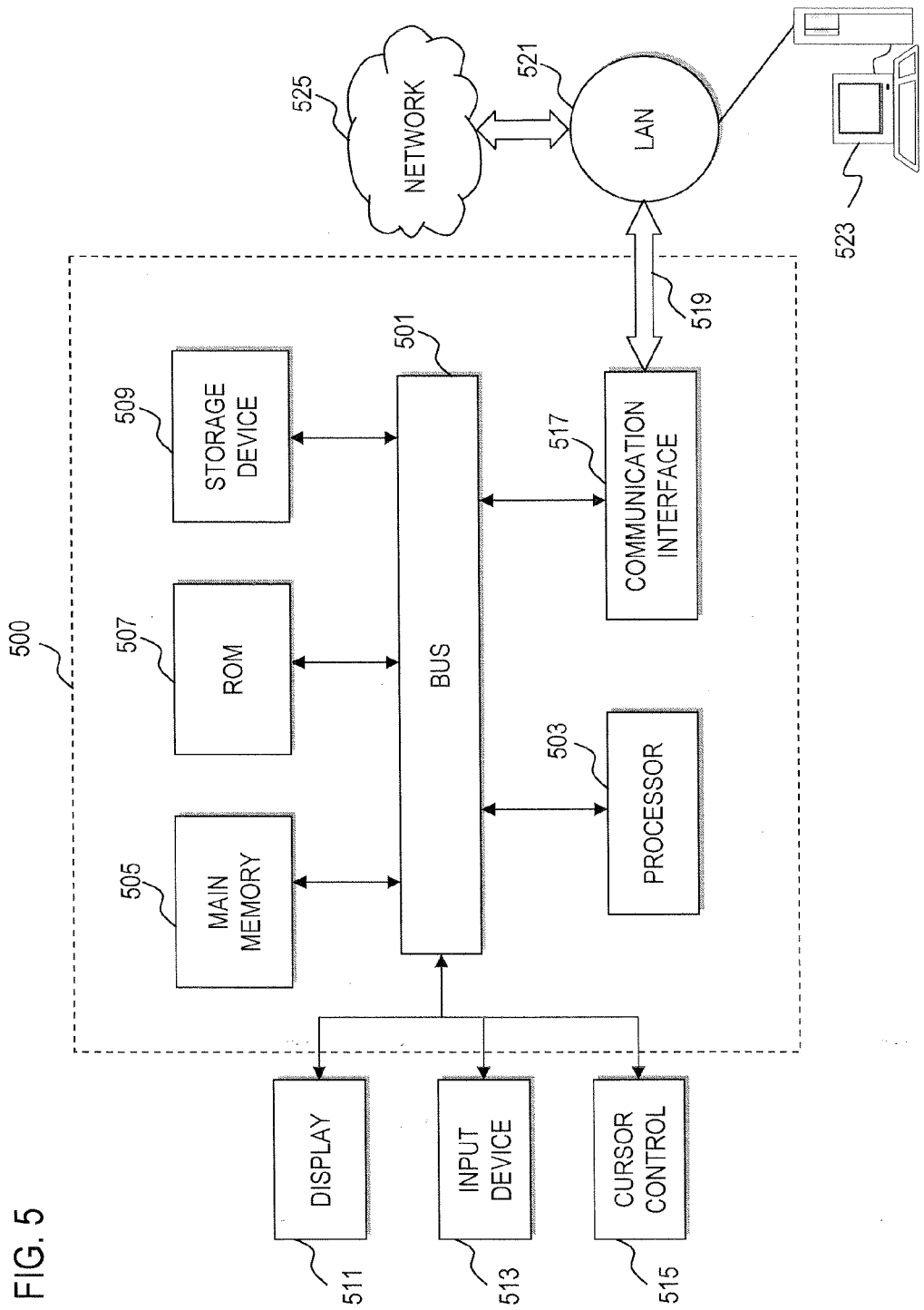
FIG. 5 is a diagram of a computer system that can be used to implement various exemplary embodiments.

FIG. 5 illustrates a computer system 500 upon which an exemplary embodiment can be implemented. For example, the processes described herein can be implemented using the computer system 500. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the exemplary embodiment. Thus, exemplary embodiments are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an exemplary embodiment through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data-on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
    establishing, by an agent, a chat session with a user for customer support;
    receiving information from the user via the chat session;
    transmitting, by the agent, the information to a content selector having an artificial intelligence algorithm;
    retrieving a profile of the user;
    determining customized content to be presented to the user over the chat session for duration of the chat session by using the information, wherein the customized content is determined by the content selector by applying the artificial intelligence algorithm to the information that is supplied via the user and according to the profile of the user, and wherein the customized content includes an advertisement;
    presenting the advertisement during an idle period of the chat session;
    receiving additional information from the user via the chat session;
    updating the customized content based on the additional information for presentation to the user during the chat session;
    storing the information and the additional information in a customer profile database; and
    updating the profile of the user upon termination of the chat session.

2. A method according to claim 1, wherein the content includes either an advertisement, a music file, a video file, a video game, or news content.

3. A method according to claim 1, the method further comprising:
    presenting one or more questions to the user over the chat session, wherein responses to the questions from the user constitute the received information.

4. A method according to claim 1, wherein the information is an identifier of the user.

5. An apparatus comprising:
    a processor configured to execute an instant messaging application configured to establish a chat session between a user and an agent for customer support,
    wherein the instant messaging application is further configured to receive information from the user via the chat session, transmit the information to a content selector having an artificial intelligence algorithm, and to retrieve a profile of the user, the information is used to determine customized content to be presented to the user over the chat session for duration of the chat session, wherein the customized content includes an advertisement and is determined by the content selector applying the artificial intelligence algorithm to the information that is supplied via the user and according to the profile of the user, and wherein the instant messaging application is further configured to present the advertisement during an idle period of the chat session, receive additional information from the user via the chat session, update the customized content based on the additional information for presentation to the user during the chat session, store the information and the additional information in a customer profile database, and to update the profile of the user upon termination of the chat session.

6. An apparatus according to claim 5, wherein the content includes either an advertisement, a music file, a video file, a video game, or news content.

7. An apparatus according to claim 5, wherein the instant messaging application is further configured to present one or more questions to the user over the chat session, and responses to the questions from the user constitute the received information.

8. An apparatus according to claim 5, wherein the information is an identifier of the user.

9. A method comprising:
 establishing a chat session with an agent for customer support;
 providing information to the agent via the chat session;
 transmitting the information to a content selector having an artificial intelligence algorithm;
 retrieving a profile of the user;
 determining customized content to be presented based on the information, wherein the customized content is determined by the content selector applying the artificial intelligence algorithm to the information and according to the profile of the user, and wherein the customized content includes an advertisement;
 presenting the advertisement during an idle period of the chat session;
 providing additional information to the agent via the chat session for updating of the customized content;
 storing the information and the additional information in a customer profile database; and
 updating the profile of the user upon termination of the chat session.

10. A method according to claim 9, wherein the content includes either an advertisement, a music file, a video file, a video game, or news content.

11. A method according to claim 9, the method further comprising:
 receiving one or more questions over the chat session; and
 responding to the questions in form of responses that constitute the information.

12. An apparatus comprising:
 a processor configured to execute an instant messaging application configured to establish a customer support chat session between a user and an agent,
 wherein information is provided to the agent via the chat session, and the information is used to determine customized content that is presented via the chat session for duration of the chat session, the instant messaging application is further configured to transmit the information to a content selector having an artificial intelligence algorithm and to retrieve a profile of the user,
 wherein the customized content includes an advertisement and is determined by the content selector applying the artificial intelligence algorithm to the information and according to the profile of the user, and
 wherein the instant messaging application is further configured to present the advertisement during an idle period of the chat session, wherein additional information is provided to the agent via the chat session for updating of the customized content, and wherein the instant messaging application is further configured to store the information and the additional information in a customer profile database, and to update the profile of the user upon termination of the chat session.

13. An apparatus according to claim 12, wherein the content includes either an advertisement, a music file, a video file, a video game, or news content.

14. An apparatus according to claim 12, wherein the instant messaging application is further configured to respond to one or more questions over the chat session, the responses constituting the information.

\* \* \* \* \*